(12) United States Patent
Kim et al.

(10) Patent No.: US 9,277,170 B2
(45) Date of Patent: *Mar. 1, 2016

(54) APPARATUS FOR TRANSCEIVING POINT TO POINT MOVING SIGNAL RECEPTION HIGH CHANNEL USING HORIZONTAL BLANKING INTERVAL AND METHOD FOR EXECUTING THE APPARATUS

(71) Applicant: ELECTRONICS AND TELECOMMUNICATIONS RESEARCH INSTITUTE, Daejeon (KR)

(72) Inventors: Jin Kyeong Kim, Daejeon (KR); Woo Yong Lee, Daejeon (KR); Hyoung Jin Kwon, Daejeon (KR); Kyeongpyo Kim, Daejeon (KR); Yong Sun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 69 days.

This patent is subject to a terminal disclaimer.

(21) Appl. No.: 13/668,533

(22) Filed: Nov. 5, 2012

(65) Prior Publication Data
US 2013/0113991 A1     May 9, 2013

Related U.S. Application Data

(63) Continuation of application No. 12/676,527, filed as application No. PCT/KR2008/004972 on Aug. 25, 2008, now Pat. No. 8,325,634.

(30) Foreign Application Priority Data

Sep. 4, 2007   (KR) ........................ 10-2007-0089560
Jun. 4, 2008   (KR) ........................ 10-2008-0052545

(51) Int. Cl.
H04B 1/44    (2006.01)
H04N 7/084   (2006.01)
(Continued)

(52) U.S. Cl.
CPC ............... *H04N 7/084* (2013.01); *H04N 7/085* (2013.01); *H04N 21/235* (2013.01); *H04N 21/435* (2013.01); *H04N 7/083* (2013.01)

(58) Field of Classification Search
CPC ..... H04N 7/085; H04N 7/084; H04N 21/435; H04N 21/235
USPC .................. 370/282, 292–296, 252, 254, 255
See application file for complete search history.

(56) References Cited

U.S. PATENT DOCUMENTS 6,400,767 B1 *  6/2002   Nuber et al. ............. 375/240.26
7,626,954 B2   12/2009   Saito
(Continued)

FOREIGN PATENT DOCUMENTS

JP       2000341553 A      8/2000
KR   1019980007674 A      3/1998
(Continued)

OTHER PUBLICATIONS

International Search Report; mailed Oct. 28, 2008; PCT/KR2008/004972.

(Continued)

*Primary Examiner* — Chuong T Ho
(74) *Attorney, Agent, or Firm* — Ladas & Parry LLP

(57) ABSTRACT

Provided are a method and apparatus for transceiving an asymmetric point-to-point moving signal and securing an uplink channel using a horizontal blanking interval (HBI) in which a video signal transceiving apparatus can combine a plurality of HBIs and a plurality of active lines (ALs) into a single section, and when auxiliary data exists in a corresponding HBI, can change an order of the HBI to the last and transmit map information including arrangement information to a video signal display apparatus, and the video signal display apparatus can receive the map information and analyze the received map information to thereby acquire an uplink channel using HBI excluding auxiliary data and transmit control signal data via the acquired uplink channel.

9 Claims, 11 Drawing Sheets

(51) Int. Cl.
*H04N 7/085* (2006.01)
*H04N 21/235* (2011.01)
*H04N 21/435* (2011.01)
*H04N 7/083* (2006.01)

(56) References Cited

U.S. PATENT DOCUMENTS

| | | | |
|---|---|---|---|
| 8,325,634 B2 * | 12/2012 | Kim | H04N 7/085 370/282 |
| 2008/0205306 A1 | 8/2008 | Saito | |
| 2009/0091656 A1 | 4/2009 | Kitaru et al. | |
| 2009/0116583 A1 | 5/2009 | Lida et al. | |
| 2009/0141180 A1 | 6/2009 | Kondo et al. | |
| 2010/0182503 A1 * | 7/2010 | Kim | H04N 7/085 348/479 |
| 2010/0201791 A1 * | 8/2010 | Slavenburg et al. | 348/53 |

FOREIGN PATENT DOCUMENTS

| | | |
|---|---|---|
| KR | 1020040040724 A | 5/2004 |
| WO | 02/01893 A2 | 1/2002 |
| WO | 0201893 A3 | 1/2002 |

OTHER PUBLICATIONS

USPTO NOA mailed Aug. 3, 2012 in connection with U.S. Appl. No. 12/676,527.

USPTO Notice of Allowability dated Aug. 22, 2012 in connection with U.S. Appl. No. 12/676,527.

* cited by examiner

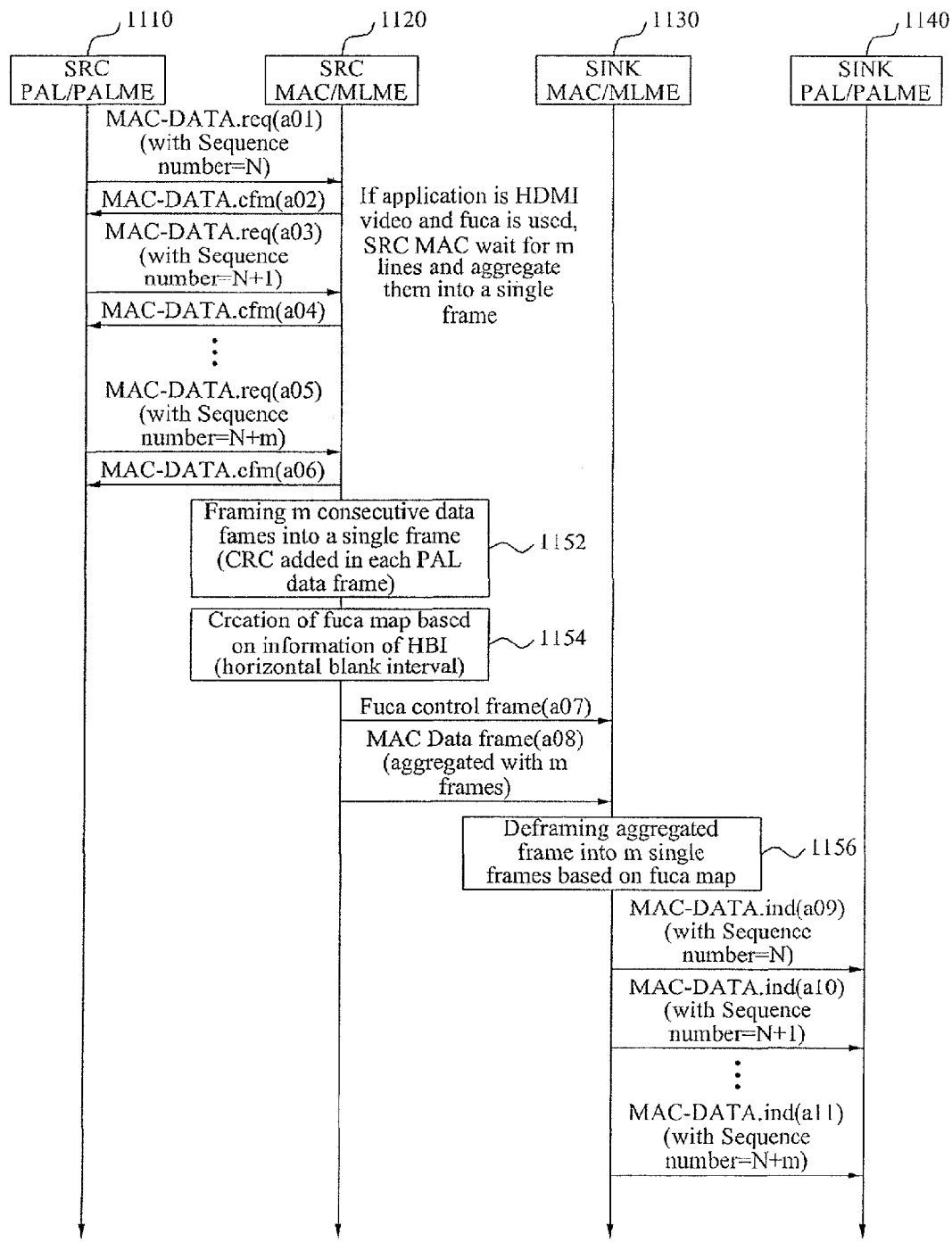

APPARATUS FOR TRANSCEIVING POINT TO POINT MOVING SIGNAL RECEPTION HIGH CHANNEL USING HORIZONTAL BLANKING INTERVAL AND METHOD FOR EXECUTING THE APPARATUS

TECHNICAL FIELD

The present invention relates to an apparatus for transceiving an asymmetric point-to-point moving signal, and more particularly, to a method and apparatus for transceiving a video signal in which a video signal display apparatus can transmit control or user data to a video signal transmission apparatus via a horizontal blanking interval (HBI).

This work was supported by the IT R&D program of MIC/IITA. [2007-S-002-01, Development of Multi-Gigabit Air Interface Technology]

BACKGROUND ART

Generally, an apparatus for transceiving a video signal denotes a data transmission system in an asymmetric point-to-point application. The data transmission system may include a video signal transmission apparatus that can transmit video and auxiliary data and a video signal display apparatus that can receive the video and auxiliary data to display the same on a screen. The video signal transmission apparatus is generally referred to as a source such as a digital video disk (DVD) player, a set-top box, and the like. The video signal display apparatus is referred to as a sink such as a liquid crystal display (LCD) television (TV), a projector, and the like. The video signal display apparatus generally receives the video only to display a video signal on the screen. Therefore, there is no need to transmit control or data to the video signal transmission apparatus to thereby control or manage an operation of the video signal transmission apparatus. However, as can be shown in a High Definition Multimedia Interface (HDMI) that is generally used for a wired system and is a representative example of a video signal transceiving system, there is a need to transmit control or data to a video signal transmission apparatus even in the video signal display apparatus. In particular, in the case of an HD video, devices transmitting and receiving the HD video may need to frequently exchange data with each other for authentication in order to protect copyrights.

For this, the video signal transmission apparatus may need to acquire a downlink channel for transmitting video and auxiliary data. Also, the video signal display apparatus may need to acquire an uplink channel for transmitting control or user data. In this instance, various types of schemes may he adopted. For example, when frequency resources are sufficient, there is a scheme that can allocate another channel with a different frequency as an uplink channel to transmit control or user data via the allocated channel using a frequency division duplex (FDD) scheme. However, in this case, there is a need for a separate modulation/demodulation apparatus. Also, the frequency resources may be unnecessarily used. Therefore, a time division duplex (TDD) scheme is currently used. The TDD scheme can perform time division duplex for the same frequency to thereby more effectively use frequency resources and also can transmit data to a single modulation/demodulation apparatus to thereby solve the above problems in an inexpensive manner. The TDD scheme can transmit data in one time and receive data in another time using a single modulation/demodulation apparatus. Therefore, the TDD scheme may need to switch a mode of a radio frequency (RF) switch to a transmission mode or a reception mode. Generally, about 2 us may be required to switch the mode of the RF switch in a wireless transmission system. In order to receive data in a horizontal blanking interval (HBI) and to transmit data in an active line (AL), the video signal transmission apparatus may need to perform two switching procedures, for example, from a transmission mode to a reception mode and then from the reception mode to the transmission mode. Therefore, at least about 4 us may need to be acquired. The following Table 1 shows a screen resolution, a number of frames, and an occupancy time of an HBI according to a color depth. As shown in Table 1, when the screen resolution is 1080p 60f, the occupancy time of the HBI is only about 1.8 us. Therefore, the video signal display apparatus cannot transmit control or user data in this interval. Also, when considering the current tendency that the HD of the video signal transceiving apparatus is becoming more favored, it may be more difficult to transmit control or user data from the video signal display apparatus to the video signal transmission apparatus. For example, when transmitting a 60-frame video or 120-frame video, the occupancy time of the HBI is only about 0.9 us.

In comparison to using an occupancy time of an HBI that is not long enough to change the mode of the RF switch, the video signal display apparatus may transmit control or user data to the video signal transmission apparatus using a vertical blanking interval (VBI). For example, when the screen resolution is 1080p 60f, the occupancy time of the VBI is about 667 us and thus there may be no problem to allocate an uplink channel in this interval. However, since the VBI appears only 60 times per second for 1080p 60f, control or user data may not be immediately transmitted as required and may need to wait until the VBI appears.

TABLE 1

| Format | V Freq | HRES | VRES | DE_CNT | DE_LIN | Rate 24 bit | Rate 20 bit | HBI (sec) | VBI (sec) |
|---|---|---|---|---|---|---|---|---|---|
| 640 × 480 | 60 | 800 | 525 | 640 | 480 | 1920 | 1600 | 6.34921E-06 | 0.001429 |
| 640 × 480 | 72 | 832 | 520 | 640 | 480 | 1920 | 1600 | 6.16371E-06 | 0.001068 |
| 640 × 480 | 75 | 840 | 500 | 640 | 480 | 1920 | 1600 | 6.34921E-06 | 0.000533 |
| 800 × 600 | 60 | 1056 | 628 | 800 | 600 | 2400 | 2000 | 6.43376E-06 | 0.000743 |
| 800 × 600 | 72 | 1040 | 666 | 800 | 600 | 2400 | 2000 | 4.8125E-06 | 0.001376 |
| 800 × 600 | 75 | 1056 | 625 | 800 | 600 | 2400 | 2000 | 5.17172E-06 | 0.000533 |
| 1024 × 768 | 60 | 1344 | 806 | 1024 | 768 | 3072 | 2560 | 4.92339E-06 | 0.000786 |
| 1024 × 768 | 70 | 1328 | 806 | 1024 | 768 | 3072 | 2560 | 4.05735E-06 | 0.000674 |
| 1024 × 768 | 75 | 1312 | 800 | 1024 | 768 | 3072 | 2560 | 3.65854E-06 | 0.000533 |
| 1024 × 768 | 85 | 1376 | 808 | 1024 | 768 | 3072 | 2560 | 3.72472E-06 | 0.000582 |
| 1280 × 1024 | 60 | 1708 | 1066 | 1280 | 1024 | 3840 | 3200 | 3.91785E-06 | 0.000657 |
| 1280 × 1024 | 75 | 1708 | 1066 | 1280 | 1024 | 3840 | 3200 | 3.13428E-06 | 0.000525 |
| 1280 × 1024 | 85 | 1728 | 1072 | 1280 | 1024 | 3840 | 3200 | 2.84525E-06 | 0.000527 |
| 480i | 59.94 | 1716 | 262/263 | 720 | 480 | 2160 | 1800 | 3.6852E-05 | 0.002802/0.002918 |

TABLE 1-continued

| Format | V Freq | HRES | VRES | DE_CNT | DE_LIN | Rate 24 bit | Rate 20 bit | HBI (sec) | VBI (sec) |
|---|---|---|---|---|---|---|---|---|---|
| 480p | 60 | 858 | 525 | 720 | 480 | 2160 | 1800 | 5.10601E-06 | 0.001429 |
| 720p | 60 | 1650 | 750 | 1280 | 720 | 3840 | 3200 | 4.98316E-06 | 0.000667 |
| 1080i | 30 | 2200 | 562/ 563 | 1920 | 1080 | 5760 | 4800 | 3.77104E-06 | 0.000652/ 0.000681 |
| 1080p | 30 | 2200 | 1125 | 1920 | 1080 | 5760 | 4800 | 3.77104E-06 | 0.001333 |
| 1080p | 60 | 2200 | 1125 | 1920 | 1080 | 5760 | 4800 | 1.88552E-06 | 0.000667 |

In the above Table 1, Format denotes a configuration of the screen resolution, V Freq denotes a vertical frequency, HRES denotes a horizontal resolution, VRES denotes a vertical resolution, DE_CNT denotes a data enable count, Rate 24 bit denotes a data amount of a single horizontal line (604 × 24/8 = 1920 bytes) when a color depth is 24 bits, Rate 20 bit denotes a data amount of a single horizontal line (640 × 20/8 = 1600 bytes) when the color depth is 20 bits, HBI denotes a horizontal blanking interval, and VBI denotes a vertical blanking interval.

DISCLOSURE OF INVENTION

Technical Goals

An aspect of the present invention provides a method and apparatus for transceiving a video signal that enables a video signal display apparatus to transmit control or user data to a video signal transmission apparatus via a horizontal blanking interval (HBI).

Another aspect of the present invention also provides a method and apparatus for securing an uplink channel using a fast HBI, instead of using a vertical blanking interval (VBI), so that a video signal display apparatus may transmit control or user data to a video signal transmission apparatus in an apparatus for transceiving an asymmetric point-to-point moving signal. The VBI appears tens of times per second.

The present invention is not limited to the above purposes and other purposes not described herein will be apparent to those of skill in the art from the following description.

Technical Solutions

According to an aspect of the present invention, there is provided a method of securing an uplink channel using a horizontal blanking interval (HBI) in a video signal transmission apparatus, the method including: receiving, from an application layer, application data that includes video data and auxiliary data; analyzing the application data to generate map information including information associated with the HBI and transmit the generated map information; when a number of HBIs excluding the auxiliary data among a total number of HBIs is greater than a predetermined value and thus the uplink channel is usable, switching a mode of a radio frequency (RF) switch from a transmission mode to a reception mode; and receiving and processing data from a video signal display apparatus via the uplink channel for an uplink channel usage period.

According to another aspect of the present invention, there is provided a method of securing an uplink channel using an HBI in a video signal display apparatus, the method including: receiving map information from a video signal transmission apparatus; analyzing the map information to verify information associated with an HBI excluding auxiliary data to be used as the uplink channel; when it is an uplink channel usage period as a result of the analysis, verifying whether usage of the uplink channel is required and the uplink channel usage period is sufficient to transmit a predetermined size of data; when the usage of the uplink channel is required and the uplink channel usage period is sufficient, switching a mode of an RF switch from a reception mode to a transmission mode; and transmitting, to the video signal transmission apparatus, data to be transmitted.

According to still another aspect of the present invention, there is provided a video signal transmission apparatus for securing an uplink channel using an HBI, the apparatus including: an application data receiver receiving, from an application layer, application data that includes video data and auxiliary data; a map generator analyzing the application data to generate map information that includes information associated with an HBI excluding auxiliary data that is used as the uplink channel; a switching decision unit determining, as an uplink channel usage period, an HBI excluding auxiliary data based on the map information to thereby determine when to switch a mode of an RF switch to a transmission mode or a reception mode; a transmitter transmitting the map information or a combined MAC data frame via a downlink channel; a MAC frame receiver receiving a control signal or data via an allocated uplink channel; and a MAC controller switching the mode of the RF switch to the transmission mode or the reception mode depending on the decision of the switching decision unit to thereby control transmission and reception.

According to yet another aspect of the present invention, there is provided a video signal display apparatus for securing an uplink channel using an HBI, the apparatus including: a MAC frame receiver receiving map information or a combined MAC data frame from a video signal transmission apparatus via a downlink channel; a map analyzer analyzing the map information to verify information associated with an HBI excluding auxiliary data that is used as the uplink channel; a switching decision unit determining, as an uplink channel usage period, an HBI excluding auxiliary data based on the map information to thereby determine when to switch a mode of an RF switch to a transmission mode or a reception mode; a MAC frame transmitter transmitting a control signal or data to the video signal transmission apparatus via an allocated uplink channel; and a MAC controller switching the mode of the RF switch to the transmission mode or the reception mode depending on the decision of the switching decision unit to thereby control transmission and reception.

Specific examples of embodiments are included in the following description and the accompanying drawings.

Advantages and features of the invention, and a method for achieving the invention will be apparent with reference to the accompanying drawings and embodiments disclosed in the following description. However, the present invention is not limited thereto or restricted thereby and may be embodied in diversified manners. The embodiments will be provided so that those skilled in the art may clearly understand the scope of the invention. The invention is defined by the claims and their equivalents. Like reference numerals refer to the like elements throughout.

Advantageous Effect

According to the present invention, there are provided a method and apparatus for transceiving an asymmetric point to-point moving signal and securing an uplink channel using a horizontal blanking interval (HBI) in which a video signal transceiving apparatus can combine a plurality of HBIs and a plurality of active lines (ALs) into a single section, and when auxiliary data exists in a corresponding HBI, can change an order of the HBI to be last and transmit map information including arrangement information to a video signal display apparatus, and the video signal display apparatus can receive the map information and analyze the received map information to thereby acquire an uplink channel using the HBI excluding auxiliary data and transmit control signal data via the acquired uplink channel. Accordingly, in comparison to using a vertical blanking interval (VBI), it is possible to relatively quickly provide the uplink channel using the HBI.

BRIEF DESCRIPTION OF DRAWINGS

FIG. 11 is a flowchart illustrating a method of transmitting a video signal from a video signal transmission apparatus to a video signal display apparatus according to an exemplary embodiment of the present invention.

BEST MODE FOR CARRYING OUT THE INVENTION

Figure 1:
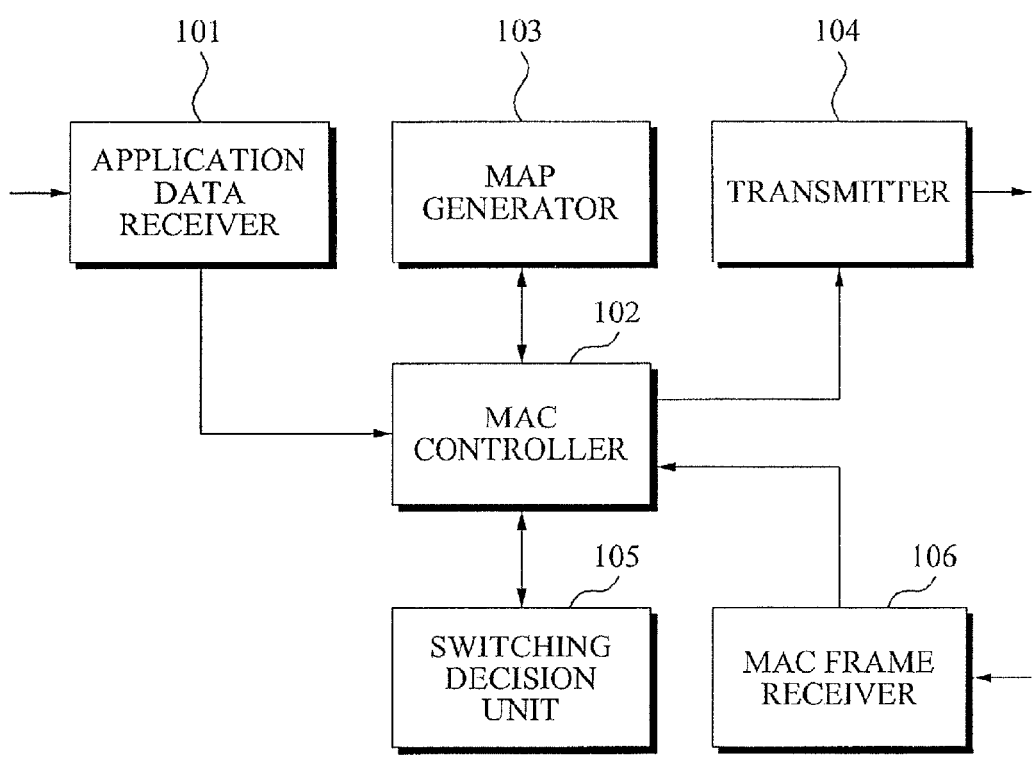
FIG. 1 is a block diagram illustrating a configuration of a video signal transmission apparatus for securing an uplink channel using a horizontal blanking interval (HBI) according to an exemplary embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

When it is determined detailed description related to a related known function or configuration may make the purpose of the present invention unnecessarily ambiguous in describing the present invention, the detailed description will be omitted herein.

According to the present invention, there may be provided a method and apparatus for transceiving a video signal in which a video signal display apparatus can transmit control or user data to a video signal transmission apparatus. Hereinafter, the video signal transceiving apparatus will be described with reference to FIGS. 1 and 2.

FIG. 1 is a block diagram illustrating a configuration of a video signal transmission apparatus for securing an uplink channel using a horizontal blanking interval (HBI) according to an exemplary embodiment of the present invention. Referring to FIG. 1, the video signal transmission apparatus includes an application data receiver 101, a Media Access Control (MAC) controller 102, a map generator 103, a transmitter 104, a switching decision unit 105, and a MAC frame receiver 106. Hereinafter, each constituent element will be described.

The application data receiver 101 may continuously receive application data from an application layer corresponding to an upper layer of MAC. The application data receiver 101 may store the received application data in a memory and inform the MAC controller 102 of the reception event. Here, the application data may be non-video information that is transferred in the HBI and video information that is transferred in an active line (AL). The non-video information may be auxiliary data containing audio information or subtitle information.

According to a request of the MAC controller 102, the map generator 103 may analyze attribute information of each HBI to generate fast uplink channel allocation (FUCA) map information. Hereinafter, the FUCA map information may be expressed as map information.

Also, according to the request of the MAC controller 102, the transmitter 104 may transmit the generated FUCA map information, or a MAC control or data frame via a downlink channel. According to the request of the MAC controller 102, the switching decision unit 105 may determine when to change a mode of a radio frequency (RF) switch based on the FUCA map information and may also inform the MAC controller 102 of the decision.

Depending on the information of the switching decision unit 105, the MAC controller 102 may switch the mode of the RF switch from a transmission mode to a reception mode, or from the reception mode to the transmission mode. When the mode of the RF switch is switched from the transmission mode to the reception mode, it may indicate that the uplink channel is activated. Conversely, when the mode of the RF switch is switched from the reception mode to the transmission mode, it may indicate that the downlink channel is activated.

The MAC frame receiver 106 may receive the MAC control or data frame via the allocated uplink channel according to the request of the MAC controller 102.

Figure 2:
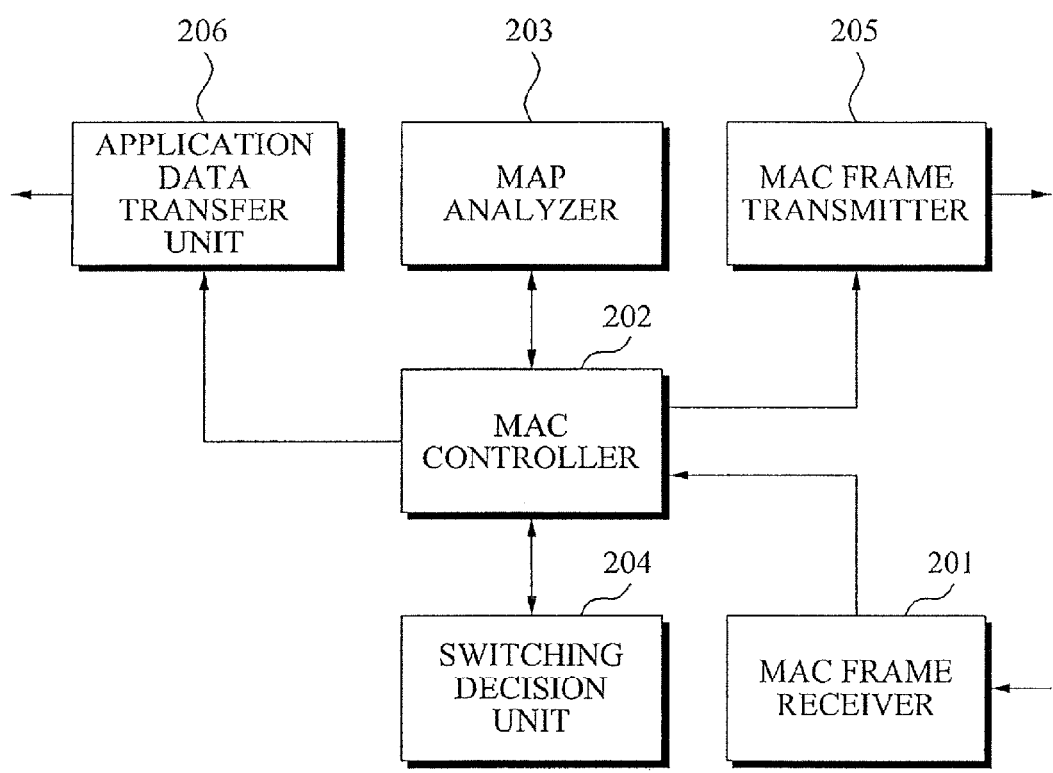
FIG. 2 is a block diagram illustrating a configuration of a video signal display apparatus for securing an uplink channel using an HBI according to an exemplary embodiment of the present invention.

FIG. 2 is a block diagram illustrating a configuration of a video signal display apparatus for securing an uplink channel using an HBI according to an exemplary embodiment of the present invention. Referring to FIG. 2, the video signal display apparatus includes a MAC frame receiver 201, a MAC controller 202, a map analyzer 203, a switching decision unit 204, a MAC frame transmitter 205, and an application data transfer unit 206. Hereinafter, each constituent element will be described.

According to a request of the MAC controller 202, the MAC frame receiver 201 may receive a MAC control and data frame, and FUCA map information that are transmitted via a downlink channel. According to the request of the MAC controller 202, the map analyzer 203 may analyze the received FUCA map information to inform the MAC controller 202 of the analysis result.

According to the request of the MAC controller 202, the switching decision unit 204 may determine when to change a mode of an RF switch based on the FUCA map information and may also inform the MAC controller 202 of the decision. Depending on the information of the switching decision unit 204, the MAC controller 202 may switch the mode of the RF switch from a transmission mode to a reception mode, or from the reception mode to the transmission mode. When the mode of the RF switch is switched from the transmission mode to the reception mode, it may indicate that the downlink channel is activated. Conversely, when the mode of the RF switch is switched from the reception mode to the transmission mode, it may indicate that the uplink channel is activated.

The MAC frame transmitter 205 may transmit the MAC control or data frame via the allocated uplink channel according to the request of the MAC controller 202. The application data transfer unit 206 may transfer data received from the MAC controller 202 to an application layer corresponding to an upper layer.

Figure 3:
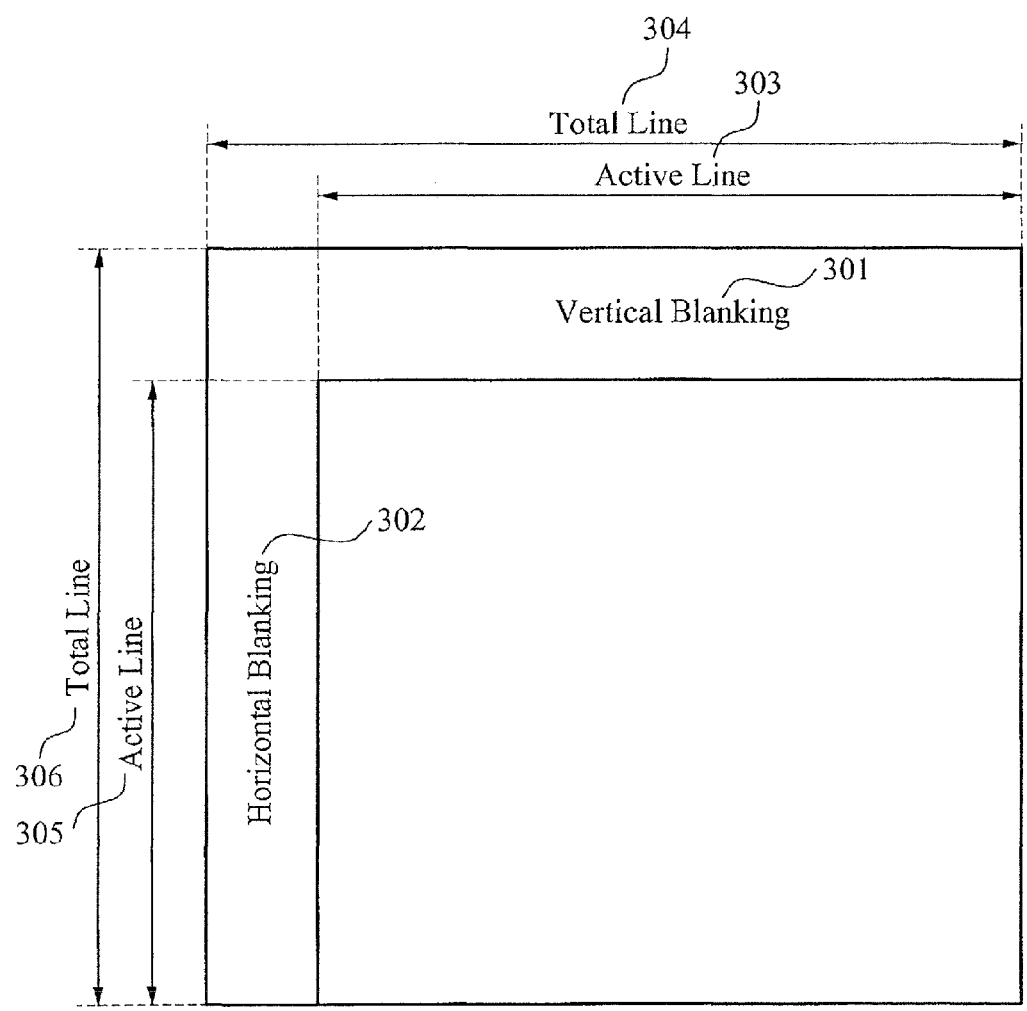
FIG. 3 illustrates a screen configuration of a general video signal transmission apparatus.

Hereinafter, a screen configuration of the above-described video signal transmission apparatus will be described in detail with reference to FIG. 3. FIG. 3 illustrates a screen configuration of a general video signal transmission apparatus.

Referring to FIG. 3, the video signal transmission apparatus may operate based on a vertical blanking interval (VBI) 301 and an HBI 302. The VBI 301 denotes a time that is required to return to a left-most upper portion of the screen in order to scan one frame and then scan a subsequent frame. The HBI 302 denotes a time that is required to return to a left-most portion in order to scan one line and then scan a subsequent line. A region excluding the HBI 302 denotes an active line 303. A region including the HBI 302 denotes a total line 304. A region excluding the VBI 301 denotes an active frame 305. A region including the VBI 301 denotes a total frame 306. Actual video information may be transmitted from the active line 303 and the active frame 305. However, a scheme of simultaneously transmitting other information such as video, audio, and the like is currently used. Generally, the video signal transmission apparatus may transmit auxiliary data containing audio information, subtitle information, and the like, in the section of the VBI 301 and the HBI 302.

Figure 4:
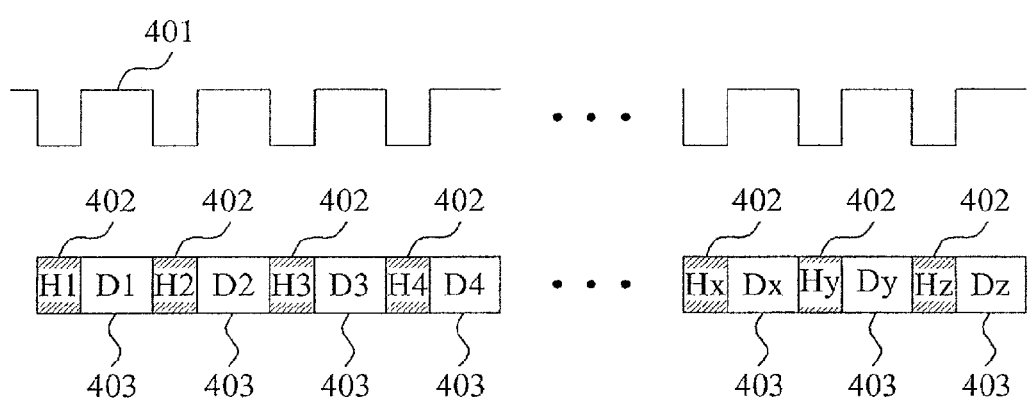
FIG. 4 illustrates a region division by a horizontal synchronization (HSYNC) signal in a general video signal transmission apparatus.

FIG. 4 illustrates a region division by a horizontal synchronization (HSYNC) signal in a general video signal transmission apparatus. Generally, when the HSYNC signal 401 is "0", the video signal transmission apparatus may determine a corresponding interval as an HBI 402 and process, as auxiliary data, data that is received in the HBI 402. Also, when the HSYNC signal 401 is "1", the video signal transmission apparatus may determine whether a corresponding interval is an active line 403 and process, as video information, data that is received in the active line 403. As shown in FIG. 4, in the general video signal transmission apparatus, a plurality of HBIs 402 and a plurality of active lines are alternatively repeated. When a lengthwise resolution of a video screen is 1080 and it is sequential scanning, a total of 1080 HBIs 402 and active lines 403 may be alternatively repeated.

Figure 5:
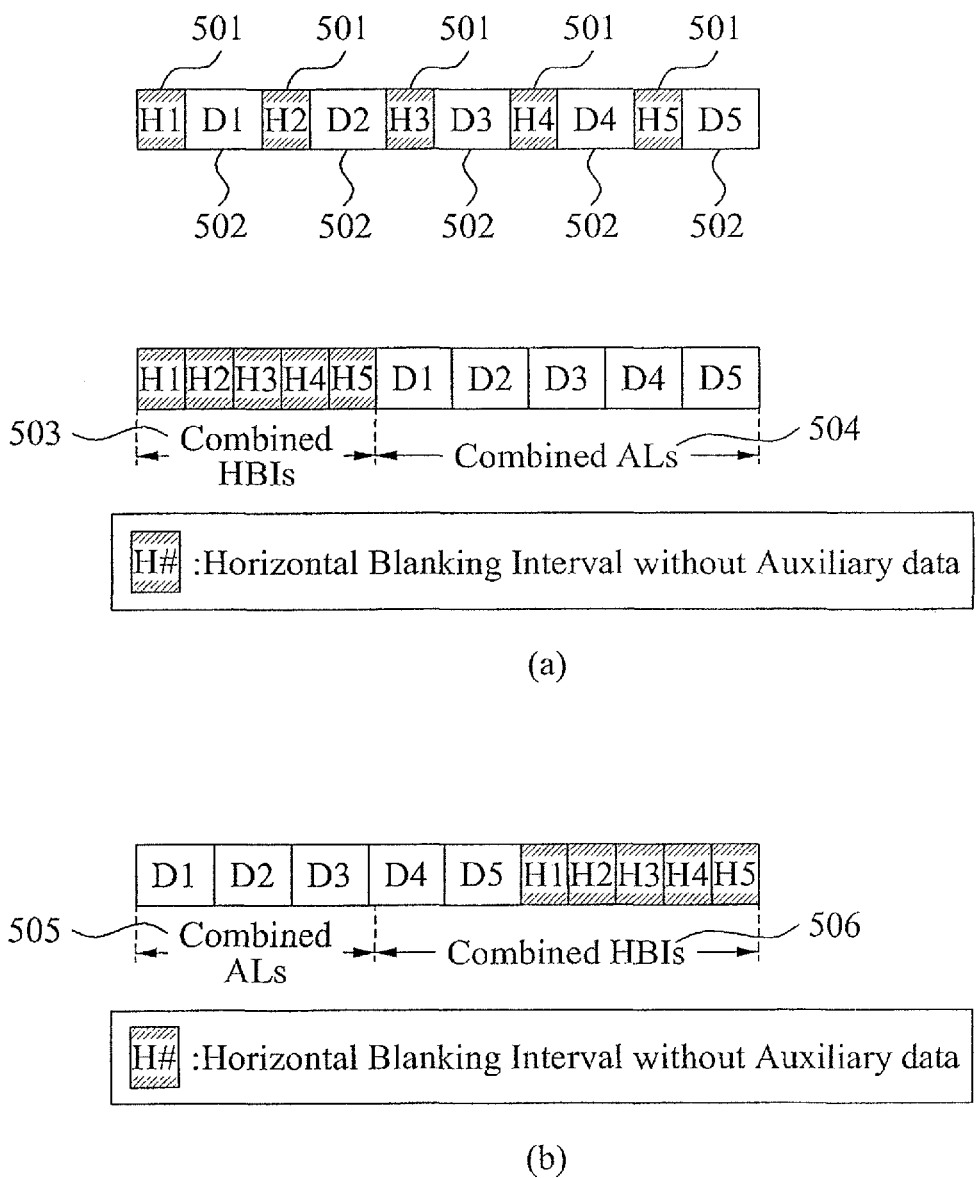
FIG. 5, parts (a) and (b), illustrate a state of combining at least one HBI in order to acquire an uplink channel in a video signal transmission apparatus according to an exemplary embodiment of the present invention.

FIG. 5, parts (a) and (b), illustrate a state of combining at least one HBI in order to acquire an uplink channel in a video signal transmission apparatus according to an exemplary embodiment of the present invention.

When data of alternatively repeating HBIs 501 and the ALs 502 is received via an application layer, the map generator 103 may form combined HBI sections 503 and 506 that are generated by combining the HBIs 501 into a single section, and combined AL sections 504 and 505 that are generated by combining the ALs 502 into a single section. For ease of description, in FIG. 5, a single set of HBIs and a single set of ALs are constructed by aggregating data of five HBIs 501 and five ALs, respectively. Here, as shown in part (a) of FIG. 5, a set of combined HBIs, that is, the combined HBI section 503 may be positioned before a set of the combined ALs, that is, the combined AL section 504. Also, as shown in part (b) of FIG. 5, a set of combined ALs, that is, the combined AL section 505 may be positioned before a set of combined HBIs, that is, the Combined HBI section 506.

A number of HBIs for securing the uplink channel in the video signal transmission apparatus may be differently set based on setting of a screen resolution. As shown in Table 2, when the video has the screen resolution of 1080p 30f, HSYNC is 3.8 us. Thus, in order acquire the uplink channel, at least tow HBIs 501 may need to be combined. When the video has the screen resolution of 1080p 60f, HSYNC is 1.9 us. Thus, in order to acquire the uplink channel, at least three HBIs 501s may need to be combined.

TABLE 2

| Format | V Freq | HRES | VRES | DE_CNT | DE_LIN | Rate 24 bit | Rate 20 bit | HBI (sec) | VBI (sec) |
|---|---|---|---|---|---|---|---|---|---|
| 1080p | 30 | 2200 | 1125 | 1920 | 1080 | 5760 | 4800 | 3.77104E-06 | 0.001333 |
| 1080p | 60 | 2200 | 1125 | 1920 | 1080 | 5760 | 4800 | 1.88552E-06 | 0.000667 |

Figure 6:
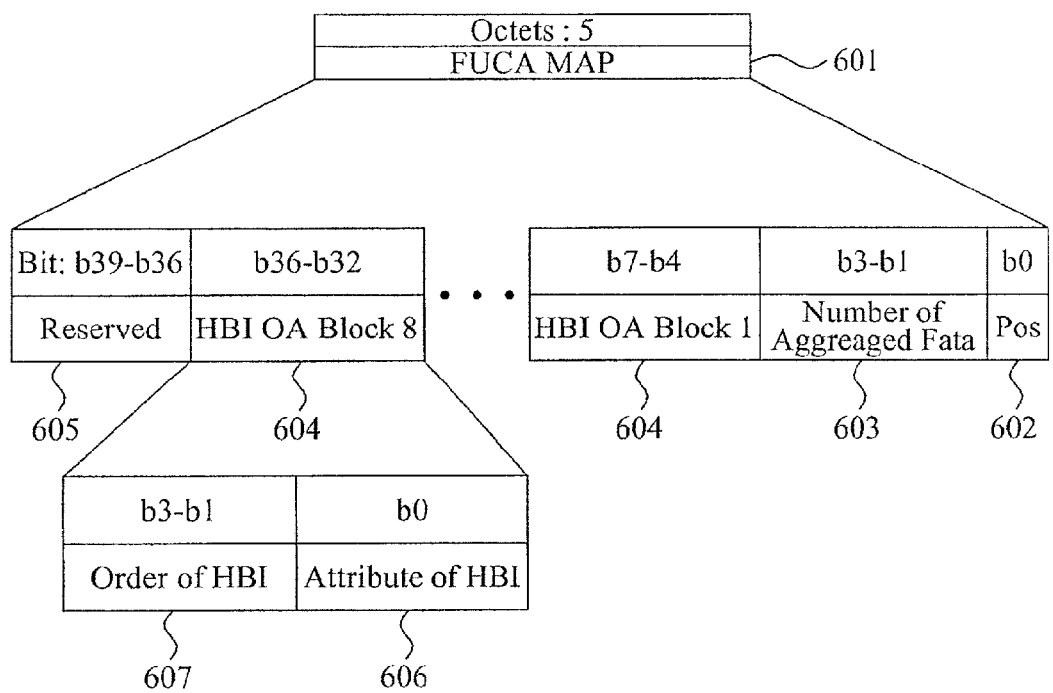
FIG. 6 illustrates the format of a fast uplink channel allocation (FUCA) map according to an exemplary embodiment of the present invention.

FIG. 6 illustrates the format of an FUCA map according to an exemplary embodiment of the present invention.

As described above, according to an aspect of the present invention, it is possible to combine, into a single set, a plurality of HBIs that frequently occurs but has a relatively very short occupancy time and to use the acquired spare time as the uplink channel. For this, the FUCA map needs to be defined as follows. The FUCA map includes a transmission order 602 of a combined HBI section and a combined AL section, a number of HBIs 603 that are combined into a single section, attribute of each HBI and actual location information thereof 604, and a space for octet sorting 605. Herein, the size of FUCA map is a maximum of 5-octet information. This indicates the maximum number of aggregated HBIs and the maximum number of aggregated ALs are eight, respectively. As required, the number of aggregated HBIs may further increase. In this case, the size of HBI map is greater than or equal to five octets.

Hereinafter, the meaning of each information element value will be described by referring to the following tables. First, in the following Table 3, when a value of the transmission order of the combined HBI section and the combined AL section 602 is "0", it corresponds to a case where the combined HBI section appears before the combined AL section. When the value is "1", it corresponds to a case where the combined AL section appears before the combined HBI section.

TABLE 3

| | Pos |
|---|---|
| Value | Description |
| 0 | Combined HBIs before Combined ALs |
| 1 | Combined ALs before Combined HBIs |

As shown in the following Table 4, the number of aggregated HBIs 603 may have a value of a minimum of 2 to a maximum of 8. When it is zero or 1, information is not valid.

TABLE 4

| Number of Aggregated Data | |
|---|---|
| Value | Description |
| 0, 1 | Not valid |
| 2~8 | Number of aggregated data |

The BHI OA Block 604 provides HBI attribute information 606 regarding whether attribute of data included in each HBI is empty or auxiliary data, and actual location information of each HBI 607. The meanings of bit values of the HBI attribute information 606 are shown in the following Table 5, and the meanings of bit values of the actual location information 607 are shown in the following Table 6.

TABLE 5

| Attribute of HBI | |
|---|---|
| Value | Description |
| 0 | Empty |
| 1 | Auxiliary data |

TABLE 6

| Order of HBI | |
|---|---|
| Value | Description |
| 1~8 | Original Order of HBI to be transmitted |

Figure 7:
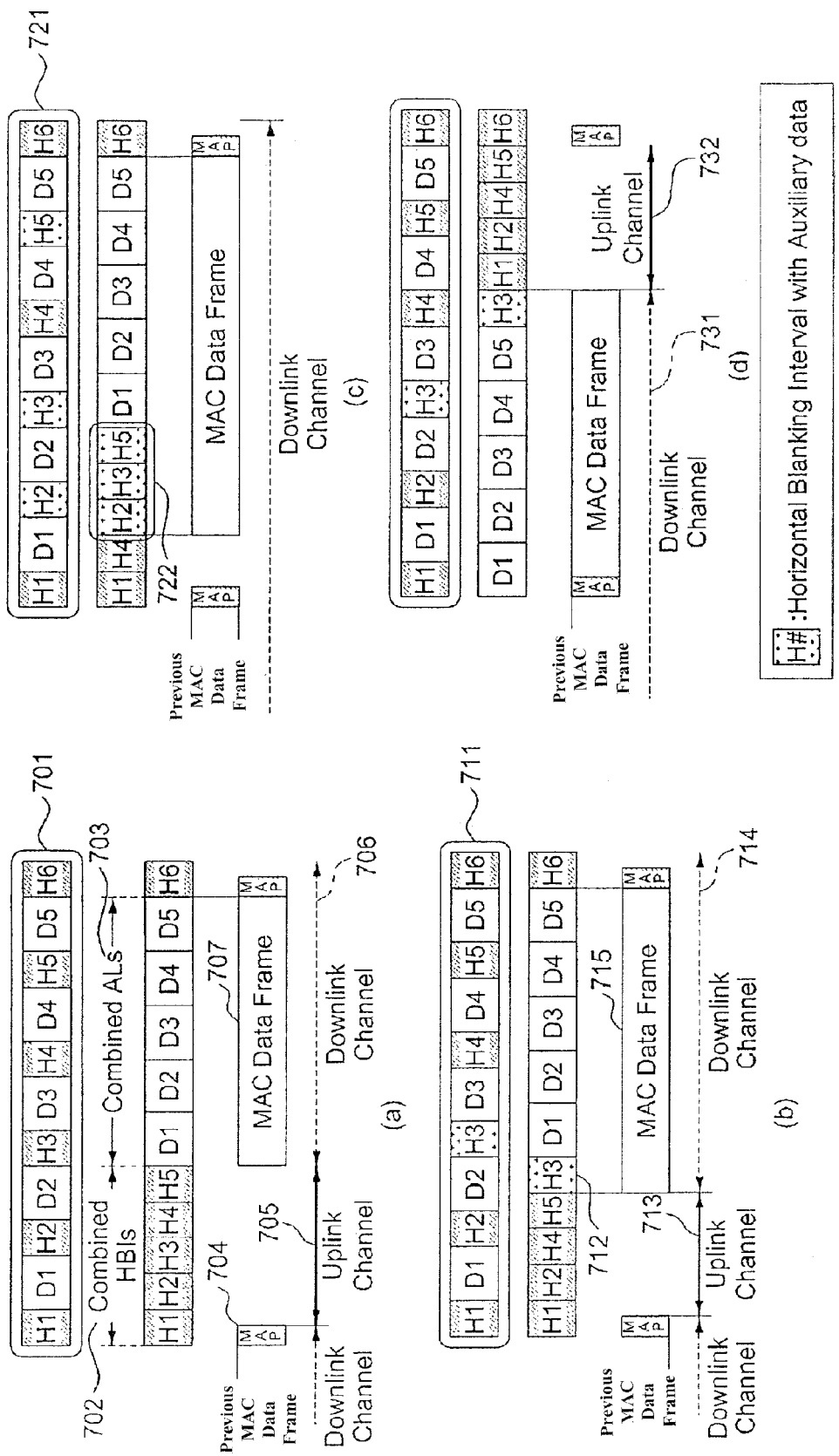
FIG. 7, parts (a), (b), (c), and (d), illustrate a format of Media Access Control (MAC) data and map information transmitted from a video signal transmission apparatus according to an exemplary embodiment of the present invention.

FIG. 7, parts (a), (b), (c), and (d), illustrate a format of Media Access Control (MAC) data and map information transmitted from a video signal transmission apparatus according to an exemplary embodiment of the present invention. For ease of description, it is assumed in FIG. 7 that five RBIs are combined as a single set.

Part (a) of FIG. 7 shows a case 701 where auxiliary data does not exist in any of five HBIs. In this case, a combined HBI section 702 is formed by sequentially combining five HBIs. Also, a combined AL section 703 is formed by sequentially combining five ALs existing among the HBIs. Therefore, a value of an information element of an FUCA map 704 is shown in the following Table 7.

TABLE 7

| Pos | Number of Aggregated Data | HBI OA |
|---|---|---|
| 0 | 5 | E1-E2-E3-E4-E5 |

The video signal display apparatus that receives the FUCA map 704 may transmit various types of control or user data using an uplink channel 705 that is acquired via the combined HBI section. When the video signal display apparatus terminates its usage of the uplink channel 705, the video signal transmission apparatus may change the uplink channel 705 to a downlink channel 706 and may transmit, to the video signal display apparatus using the downlink channel 706, a MAC data frame 707 that includes video information of the combined AL section 703.

Part (b) of FIG. 7 shows a case 711 where auxiliary data exists in the third HBI among five HBIs. In this case, when forming the combined HBI section by combining five HBIs, an order of auxiliary data 712 existing in the third HBI may be changed to be positioned last. In this case, a value of an information element of FUCA map is shown in the following Table 8.

TABLE 8

| Pos | Number of Aggregated Data | HBI OA |
|---|---|---|
| 0 | 5 | E1-E2-E4-E5-A3 |

The video signal display apparatus that receives a FUCA map may verify whether it is possible to use only four allocated HBIs as an uplink channel, based on the FUCA map information. For example, when a video signal is 1080p 60f 24b, it is possible to use as the uplink channel only when combining at least three HBIs as a single set. Therefore, when four HBIs are combined as the single set, it is possible to use a corresponding section as the uplink channel. The video signal display apparatus may transmit control or user data via an allocated uplink channel 713. When the video signal display apparatus terminates its usage of the uplink channel 713, the video signal transmission apparatus may immediately change the uplink channel 713 to a downlink channel 714. The video signal transmission apparatus may transmit, to the video signal display apparatus using the downlink channel 714, a MAC data frame 715 that includes third auxiliary data and video information of the combined AL section.

Part (c) of FIG. 7 shows a case 721 where auxiliary data exists in second, third, and fifth HBIs among five HBIs. In this case, when forming the single combined HBI section by combining five HBIs as a single set, an order of auxiliary data existing in the second, third, and fifth HBIs may be changed to be positioned in the last 722. In this case, a value of an information element of a FUCA map is shown in the following Table 9.

TABLE 9

| Pos | Number of Aggregated Data | HBI OA |
|---|---|---|
| 0 | 5 | E1-E4-A2-A3-A5 |

The video signal display apparatus that receives a FUCA map may verify whether it is possible to use only two allocated HBIs as an uplink channel, based on the FUCA map information. For example, when a video signal is 1080p 60f 24b, it is possible to use as the uplink channel only when combining at least three HBIs as a single set. Therefore, when two HBIs are combined as the single set, it is impossible to use the corresponding section as the uplink channel. In this case, since the video signal display apparatus does not use the uplink channel, the video signal transmission apparatus may not change a downlink channel to an uplink channel and instead maintain the downlink channel as is. In this state, the video signal transmission apparatus may transmit, to the video signal display apparatus, a MAC data frame that includes second, third, and fifth auxiliary, and video information of the combined AL section 703. The HBI is not in an empty state all times but can be filled with subtitle information, audio information, and the like. Therefore, a number of HBIs to be combined as a single set may need to he determined by considering that auxiliary data is used.

Part (d) of FIG. 7 is a case where auxiliary data exists in a third HBI among five HBIs, which is the same as part (b) of FIG. 7, but a transmission order of a combined HBI section and combined AL section is changed. In this case, five ALs that are combined as a single set and an HBI with auxiliary data appear before the combined HBI section. In this case, a value of an information element of a FUCA map is shown in the following Table 10.

TABLE 10

| Pos | Number of Aggregated Data | HBI OA |
| --- | --- | --- |
| 1 | 5 | A3-E1-E2-E4-E5 |

When the video signal display apparatus terminates its usage of a downlink channel 731, the video signal display apparatus may verify whether it is possible to use only four allocated HBIs as an uplink channel 732, based on the FUCA map information. When it is possible to use the HBIs as the uplink channel, the video signal display apparatus may change the downlink channel 731 to the uplink channel 732 and may transmit, to the video signal transmission apparatus using the uplink channel 732, control or user data. The big difference between parts (b) and (d) may lie in validity of control information. In the case of part (b) of FIG. 7, data is not transmitted yet. Therefore, description of control information is about confirmation or response about previous data of FUCA map information. In the case of part (d) of FIG. 7, description of control information is about confirmation or response about data transmitted after receiving FUCA map. Accordingly, the cases shown in part (d) of FIG. 7 may be regarded to provide a more spontaneous confirmation or response. Which scheme to use depends on a user.

Figure 8:
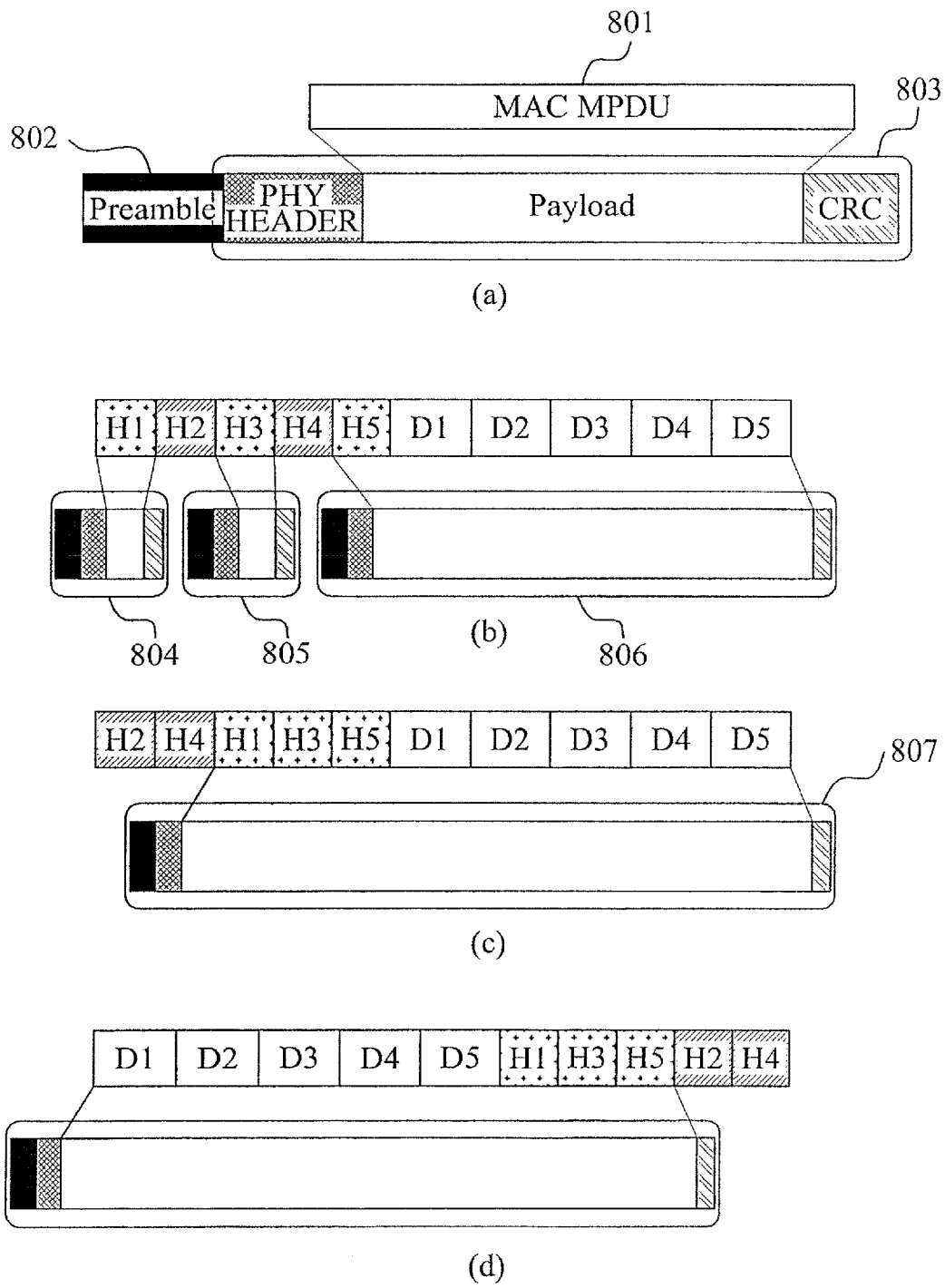
FIG. 8, parts (a), (b), (c), and (d), illustrate an example of improving a transmission rate in a physical layer in a video signal transmission apparatus according to an exemplary embodiment of the present invention.

FIG. 8, parts (a), (b), (c), and (d), illustrate an example of improving a transmission rate in a physical layer in a video signal transmission apparatus according to an exemplary embodiment of the present invention. Generally, so that a correspondent physical layer may obtain data, a physical layer that receives a MAC data frame 801 may adopt a scheme of initially transmitting a preamble 802, performing synchronization, and then transmitting physical (PHY) data 803 that includes a PHY header, a payload, and a cyclic redundancy check code (CRC) as shown in part (a) of FIG. 8. This scheme is a scheme that the physical layer generally transmits PHY data. This scheme may be applicable when transmitting video and auxiliary data as is.

When combining a plurality of HBIs as a single set and not changing a location of auxiliary data, video and auxiliary data may be contained in three PHY data 804, 805, and 806, and thereby be transmitted as shown in part (b) of FIG. 8. However, like the present embodiment, when combining a plurality of HBIs as a single set and disposing all the existing data to be last to thereby transmit the auxiliary data, video and auxiliary data may be contained in single PHY data 807 and thereby be transmitted as shown in part (c) of FIG. 8. Accordingly, in this case, only two sets of HBIs are combined. Therefore, it may be the same in an aspect that the uplink channel is not acquired as shown in part (b) of FIG. 8. However, since video and auxiliary data are contained in single PHY data and thereby transmitted, it is possible to obtain a more enhanced transmission rate of the physical layer in comparison to part (b) of FIG. 8 where video and auxiliary data are divided into three PHY data and transmitted.

Unlike part (c) of FIG. 8, in part (d) of FIG. 8, a combined AL section appears before a combined HBI section. Even in this case, it is possible to obtain a more enhanced transmission rate in comparison to part (b) of FIG. 8.

Hereinafter, a method of securing an uplink channel using an apparatus for transceiving an asymmetric point-to-point moving signal constructed as above will be described.

Figure 9:
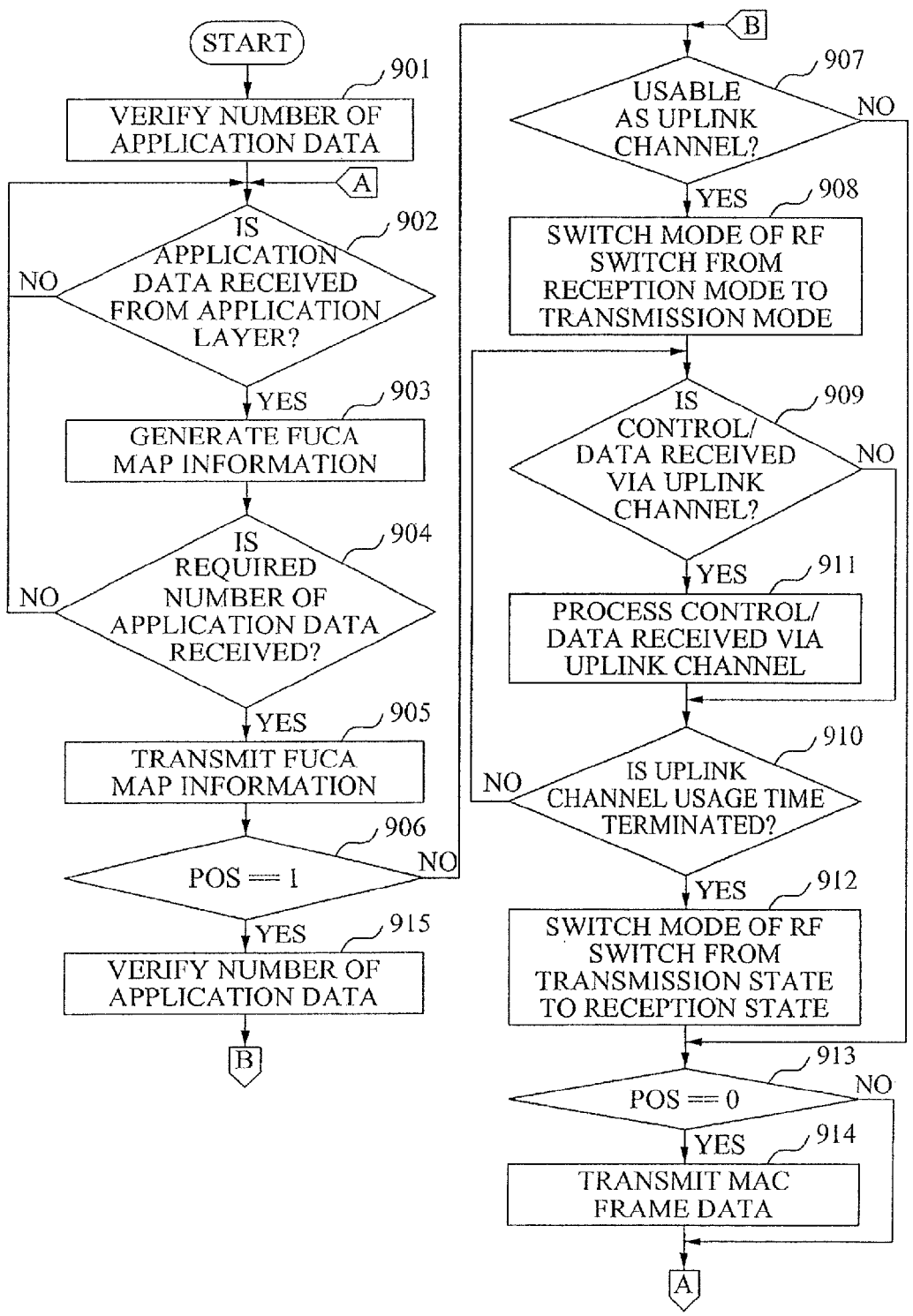
FIG. 9 is a flowchart illustrating a method of securing an uplink channel using an HBI in a video signal transmission apparatus according to an exemplary embodiment of the present invention.

FIG. 9 is a flowchart illustrating a method of securing an uplink channel using an HBI in a video signal transmission apparatus according to an exemplary embodiment of the present invention.

Referring to FIG. 9, in operation 901, the video signal transmission apparatus may verify how many pieces of application data to combine as a single set. The application data contains video information and auxiliary data of a single scan line. In operation 902, the video signal transmission apparatus may continuously perform monitoring until application data is received from an application layer.

When the application data is received from the application layer, the video signal transmission apparatus may generate an FUCA map where an HBI with auxiliary data is positioned to be last in operation 903. In operation 904, the video signal transmission apparatus may verify whether a required number of application data is received from the application layer. When the required number of application data is not received from the application layer in operation 904, the video signal transmission apparatus may return to operation 902 and wait for receiving remaining application data from the application layer.

Conversely, when the required number of application data is received from the application layer in operation 904, the video signal transmission apparatus may generate a MAC control frame based on the generated FUCA map information and transmit MAC control frame to a video signal display apparatus in operation 905.

In operation 906, the video signal transmission apparatus may verify whether a combined AL section is transmitted before a combined HBI section. Specifically, the video signal transmission apparatus may verify whether to allocate the uplink channel before or after transmitting data.

When initially transmitting the combined HBI section before the combined AL section, the video signal transmission apparatus may verify whether it is possible to use the combined HBI section as the uplink channel in operation 907. When it is possible, the video signal transmission apparatus may change a mode of an RF switch to a reception mode in operation 908. In operation 909, the video signal transmission apparatus may wait to receive a MAC frame that contains control or user data transmitted from the video signal display apparatus via the uplink channel.

When the video signal display apparatus does not receive, from the video signal display apparatus, the MAC frame containing the control or user data via the uplink channel, the video signal transmission apparatus may verify whether an uplink channel usage time is terminated in operation 910. Conversely, when the video signal display apparatus receives the MAC frame from the video signal display apparatus, the video signal transmission apparatus may process control or user data in operation 911 and verify whether the uplink channel usage time is terminated in operation 910. When the uplink channel usage time is not terminated, the video signal transmission apparatus may return to operation 909 and repeat operations 909 through 911 until the uplink channel usage time is terminated.

When the uplink channel usage time is terminated, the video signal transmission apparatus may change the mode of the RF switch from the reception mode to a transmission mode in operation 912. In operation 913, the video signal transmission apparatus may verify whether the combined HBI section is initially transmitted before the combined AL section. When the combined HBI section is initially transmitted, the video signal transmission apparatus may transmit a MAC data frame to the video signal display apparatus in operation 914. In order to continuously repeat the above process until the service of the video signal transceiving apparatus is terminated, the video signal transmission apparatus may return to operation 902 and wait for receiving application data from the application layer.

When the combined HBI sections are too short to be used as the uplink channel, the video signal transmission apparatus may maintain the mode of the RF switch as the transmission mode without changing the mode. In operation 913, the video signal transmission apparatus may verify whether the combined HBI section is initially transmitted. In operation S914, the video signal transmission apparatus may transmit the combined MAC data frame to the video signal display apparatus at a given point in time.

When the combined AL section is initially transmitted before the combined HBI section in operation 906, the video signal transmission apparatus may transmit the combined MAC data frame to the video signal display apparatus in operation 915. Next, the video signal transmission apparatus may perform operations 907 through 913 in the same way as the process of initially transmitting the combined HBI section. In the procedure of changing the mode of the RF switch from the reception mode to the transmission mode and then verifying whether the combined HBI section is initially transmitted, the MAC frame is transmitted. Therefore, the video signal transmission apparatus may disregard it and repeat operations from the start.

Figure 10:
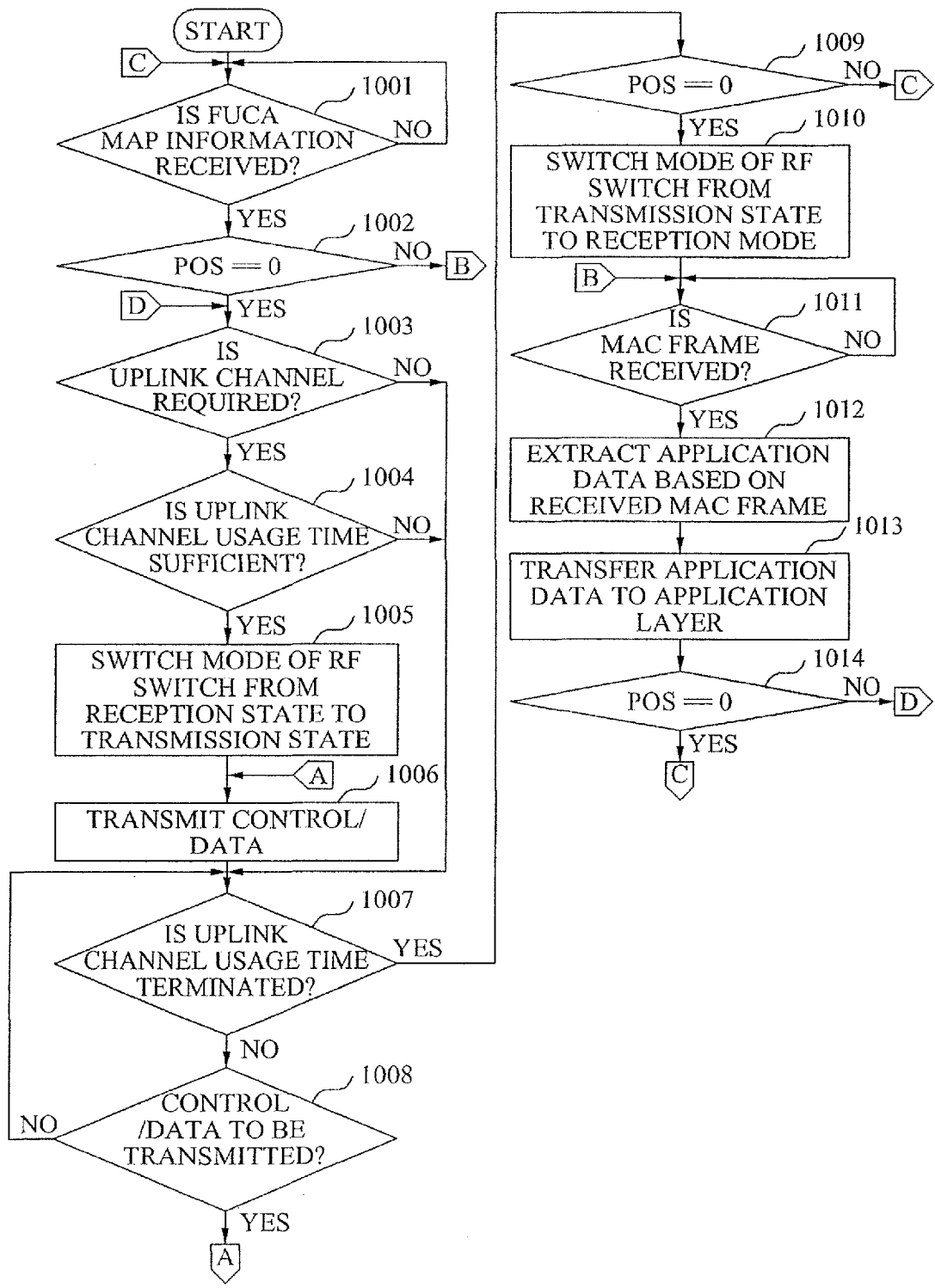
FIG. 10 is a flowchart illustrating a method of securing an uplink channel using an HBI in a video signal display apparatus according to an exemplary embodiment of the present invention.

FIG. 10 is a flowchart illustrating a method of securing an uplink channel using an HBI in a video signal display apparatus according to an exemplary embodiment of the present invention.

Referring to FIG. 10, in operation 1001, the video signal display apparatus may continuously monitor FUCA map information that is transmitted from a video signal transmission apparatus. When the FUCA map information is received, the video signal display apparatus may verify whether a combined HBI section is initially transmitted before a combined AL section in operation 1002. When the combined HBI section is initially transmitted, the video signal display apparatus may verify whether it is necessary to transmit control or data using the uplink channel in operation 1003. When it is necessary, the video signal display apparatus may verify whether an uplink channel usage time is sufficient to transmit data based on FUCA map information in operation 1004.

When the uplink channel usage time is sufficient, the video signal display apparatus may change the mode of the RF switch from the reception mode to the transmission mode in operation 1005. In operation 1006, the video signal display apparatus may transmit, to the video signal transmission apparatus using the uplink channel, a MAC frame that contains control or user data.

Conversely, when the uplink channel is not required or when the uplink channel usage time is insufficient, the video signal display apparatus may transmit the MAC frame using the uplink channel. In operation 1007, the video signal display apparatus may verify whether the uplink channel usage time is terminated.

When the uplink channel usage time is not terminated, the video signal display apparatus may verify whether there exists control or user data to be transmitted using the uplink channel in operation 1008. When control or user data exists, the video signal display apparatus may return to operation 1007 and transmit, to the video signal transmission apparatus using the uplink channel, the MAC frame that contains control or user data to be transmitted.

Conversely, when the uplink channel usage time is terminated, the video signal display apparatus may verify whether the combined HBI section is initially transmitted before changing the mode of the RF switch, in operation 1009. When the combined HBI section is initially transmitted, the video signal display apparatus may change the mode of the RF switch from the transmission mode to the reception mode in operation 1010.

In operation 1011, the video signal display apparatus may wait until the MAC frame containing video and auxiliary data is received via a downlink channel. When the MAC frame is received, the video signal display apparatus may sequentially extract application data based on the received MAC frame and FUCA map information in operation 1012. In operation 1013, the video signal display apparatus may transfer the extracted data to the application layer. In operation 1014, the video signal display apparatus may verify whether the combined HBI section is initially transmitted. When the combined HBI section is initially transmitted, the video signal display apparatus may return to operation 1001 in order to receive subsequent FUCA map information.

Conversely, when the combined AL section is initially transmitted, the video signal display apparatus may monitor whether the MAC frame to be transmitted via the downlink channel is received in operation 1011. The following process will be the same as the process where the combined HBI section is initially transmitted, by operation 1014. In operation 1014, it is verified that the combined AL section is initially transmitted. Therefore, the video signal display apparatus may return to operation 1003 and perform an operation of transmitting control or user data via the uplink channel. Also, since it is verified that the combined AL section is initially transmitted in operation 1009, the video signal transmission apparatus may not perform an operation that is performed when the combined HBI section is initially transmitted and then return to operation 1001 in order to receive subsequent FUCA map information. This is because the MAC frame to be received via the downlink channel is already received.

FIG. 11 is a flowchart illustrating a method of transmitting a video signal from a video signal transmission apparatus to a video signal display apparatus according to an exemplary embodiment of the present invention.

Referring to FIG. 11, an application layer 1110 of the video signal transmission apparatus may transmit MAC-DATA.req (a01, a03, a05) to a MAC layer 1120 of the video signal transmission apparatus to request data transmission. Here, MAC-DATA.req(a01, a03, a05) may be video signal data that have a sequence number.

The MAC layer 1120 receiving MAC-DATA.req(a01, a03, a05) may transmit, to the application layer 1110, MAC-DATA.cfm(a02, a04, a06) informing a success or a failure of the data transmission. In operation 1152, the application layer 1120 may frame m consecutive data into a single frame. In this instance, the application layer 1120 may insert a CRC into each consecutive data.

In operation 1154, the MAC layer 1120 may generate FUCA map information based on HBI information. Next, the MAC layer 1120 may transfer, to a MAC layer 1130 of the video signal display apparatus, Fuca control frame(a07) that includes the generated FUCA map and may transfer, to the MAC layer 1130, MAC Data frame(a08) that is the frame generated in operation 1152.

In operation 1156, the MAC layer 1130 may deframe MAC Data frame(a08) into m consecutive data based on the FUCA map information included in Fuca control frame(a07) and transfer, to an application layer 1140 of the video signal display apparatus, MAC-DATA.ind(a09, a10, a11) which are the m consecutive data.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A signal transmission apparatus for securing an uplink channel using an HBI, the apparatus comprising:
    an application data receiver receiving, from an application layer, application data that includes multimedia data and auxiliary data;
    a map generator analyzing the application data to generate map information that includes information associated with an HBI excluding auxiliary data that is used as the uplink channel, wherein a number of HBIs for securing the uplink channel is set based on setting of a screen resolution; and
    a transmitter transmitting the map information or a combined MAC data frame via a downlink channel.

2. The apparatus of claim 1, wherein when a number of HBIs excluding the auxiliary data among a total number of HBIs is greater than a predetermined value and thus the uplink channel is usable.

3. The apparatus of claim 2, wherein information associated with the attribute of each HBI indicates whether auxiliary data exists in a corresponding HBI to thereby inform whether the corresponding HBI is usable as the uplink channel.

4. The apparatus of claim 1, wherein the combined MAC data frame is generated by combining, into a single MAC data frame, auxiliary data and video data included in the AL section.

5. The apparatus of claim 1, wherein the combined MAC data frame includes a different CRC for each of auxiliary data and multimedia data.

6. The apparatus of claim 1, further comprising: a switching decision unit determining, as an uplink channel usage period, an HBI excluding auxiliary data based on the map information to thereby determine when to switch a mode of an RF switch to a transmission mode or a reception mode; a MAC frame receiver receiving a control signal or data via an allocated uplink channel; and a MAC controller switching the mode of the RF switch to the transmission mode or the reception mode depending on the decision of the switching decision unit to thereby control transmission and reception, wherein the map information comprises information regarding a transmission order of a combined HBI section and a combined AL section, a number of HBIs that are combined in a single section, attribute about each HBI, an actual location of each HBI, and octet sorting.

7. A signal display apparatus for securing an uplink channel using an HBI, the apparatus comprising:
    a MAC frame receiver receiving map information or a combined MAC data frame from a multimedia signal transmission apparatus via a downlink channel;
    a map analyzer analyzing the map information to verify information associated with an HBI excluding auxiliary data that is used as the uplink channel;
    a switching decision unit determining, as an uplink channel usage period, an HBI excluding auxiliary data based on the map information to thereby determine when to switch a mode of an RF switch to a transmission mode or a reception mode;
    a MAC frame transmitter transmitting a control signal or data to the multimedia signal transmission apparatus via an allocated uplink channel, wherein a number of HBIs for securing the uplink channel is set based on setting of a screen resolution; and
    a MAC controller switching the mode of the RF switch to the transmission mode or the reception mode depending on the decision of the switching decision unit to thereby control transmission and reception, wherein the map information comprises information regarding a transmission order of a combined HBI section and a combined AL section, a number of HBIs that are combined in a single section, attribute about each HBI, an actual location of each HBI, and octet sorting.

8. The apparatus of claim 7, wherein when a number of HBIs excluding the auxiliary data among a total number of HBIs is greater than a predetermined value and thus the uplink channel is usable.

9. The apparatus of claim 7, wherein information associated with the attribute of each HBI indicates whether auxiliary data exists in a corresponding HBI to thereby inform whether the corresponding HBI is usable as the uplink channel.

* * * * *